A. G. FITZ GERALD.
TIRE.
APPLICATION FILED JUNE 25, 1914.

1,185,082.

Patented May 30, 1916.
2 SHEETS—SHEET 1.

WITNESSES
C. F. Polk.
J. A. Holton

INVENTOR
A. G. Fitz Gerald
BY
Drull Oberfuls & Drull
ATTORNEYS

A. G. FITZ GERALD.
TIRE.
APPLICATION FILED JUNE 25, 1914.
1,185,082.
Patented May 30, 1916.
2 SHEETS—SHEET 2.
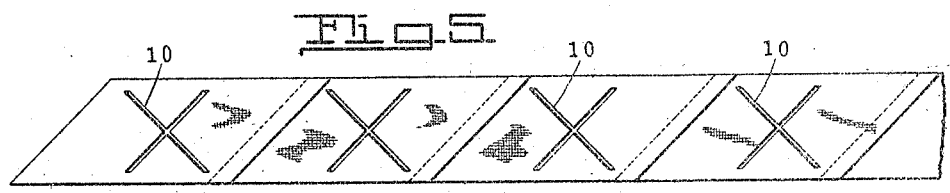
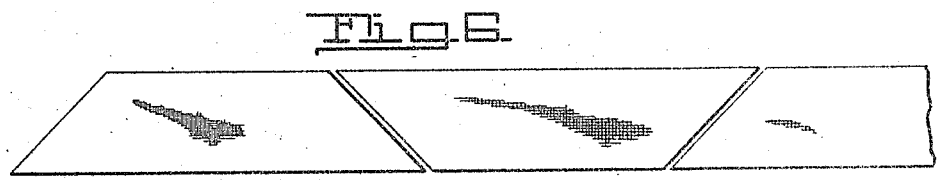
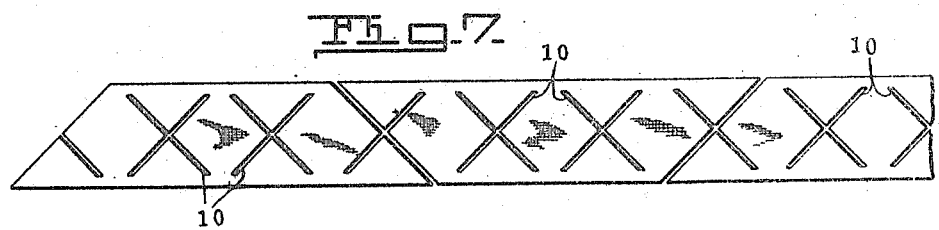
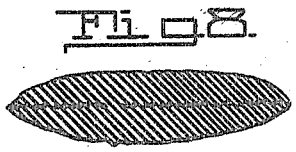

UNITED STATES PATENT OFFICE.

A. GROVER FITZ GERALD, OF BOSTON, MASSACHUSETTS, ASSIGNOR, BY MESNE ASSIGNMENTS, TO RELIANCE A. C. COMPANY, INC., OF NEW YORK, N. Y., A CORPORATION OF NEW YORK.

TIRE.

1,185,082. Specification of Letters Patent. Patented May 30, 1916.

Application filed June 25, 1914. Serial No. 847,171.

*To all whom it may concern:*

Be it known that I, A. GROVER FITZ GERALD, a citizen of the United States, residing at Boston, in the county of Suffolk and State of Massachusetts, have invented certain new and useful Improvements in Tires, of which the following is a full, clear, and exact description, such as will enable others skilled in the art to which it appertains to make and use the same.

This invention relates to tires, and with regard to certain more specific features thereof, to pneumatic tires, particularly to tires composed of rubber or the like wherein a fabric or other means is employed to cause compression of the rubber in the tread portion to render the tire puncture-proof.

It is one of the objects of the invention to provide a simple and practical tire of the above-mentioned type.

It is another object of the invention to provide reliable and otherwise improved means whereby the material of the tread portion of the tire may be held compressed.

Another object of the invention is to provide effective means whereby friction between the inner tube and its shoe is obviated or reduced to a minimum.

Still another object of the invention is to provide in the fabric longitudinal joints of a yielding character, whereby a tendency of the fabric to break on the application of unusual pressure is avoided.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 2:
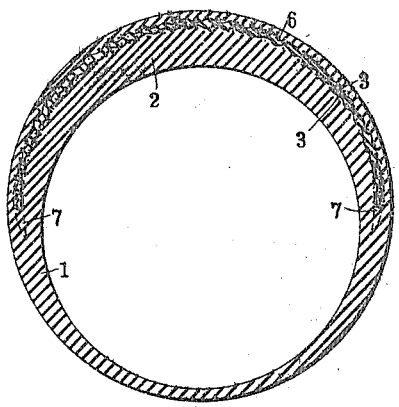
Figure 3:
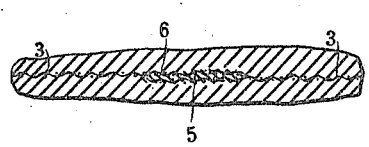
Figure 4:
Figure 1:
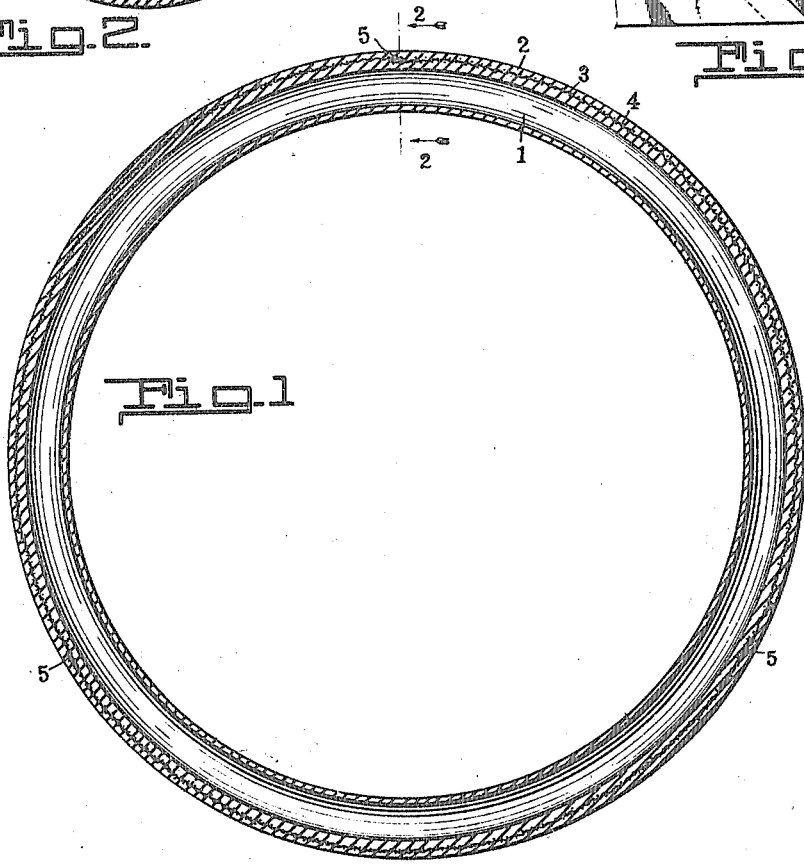

In the accompanying drawings, wherein is shown one of various possible embodiments of the invention, Figure 1 is a longitudinal central section of a tire embodying features of the invention; Fig. 2 is a transverse sectional view taken on the line 2—2 of Fig. 1; Fig. 3 is a fragmentary sectional view, showing the yielding joint in the fabric; Fig. 4 is a development of a portion of the fabric, showing the joint; Figs. 5, 6 and 7 are development views of modified forms of the fabric; and Fig. 8 is a sectional view of a portion of a tube showing the form of the joint of the fabric illustrated in the development in Fig. 6 or 7.

Referring now more particularly to the drawings, wherein similar reference characters refer to similar parts throughout the several views, the numeral 1 indicates an inner tube preferably of rubber and having an enlarged tread portion 2. Within the tube 1, there is embedded an annular flexible stay, or constricting element 3, preferably composed of fabric 4, which is broken at intervals as indicated at 5. Where the break 5 occurs the adjacent ends of the fabric are overlapped and connected together as by stepping a layer or layers of rubber between and vulcanizing, or by a portion 6 of rubber or other suitable elastic or resilient material, the connection being made preferably by what is known in the art as "frictionizing."

In the embodiment shown in Fig. 1, there are provided three individual strips of fabric respectively disposed at different longitudinal portions of the tube, adjacent ends of these stay strips being connected together as described, and the three strips forming, when so connected, a continuous annular constricting element, or stay which, when the tube is inflated, serves to compress the rubber in the tread portion 2 to such a degree that it renders the tire highly puncture-proof and at the same time permits circumferential expansion of the tube.

Heretofore tires have been constructed embodying a continuous annular strip of fabric, either made in one piece or having its ends connected together by a cement or other non-elastic or non-resilient material. In such cases it has been found that the fabric substantially hinders circumferential expansion of the tube and that, accordingly, the tube develops a tendency to slip within its shoe, whereupon considerable friction is created, heating both elements. By the present invention a tube is provided which permits sufficient circumferential expansion to minimize slipping in the shoe; at the same time the fabric serves to exert a transverse compression at all points around the tread portion of said tube, maintaining the benefits of such compression. It will be noted that adjacent ends of the strips of fabric are overlapped to obtain the desired joint and it therefore follows that there is no point around the entire periphery of the tube which is not subjected to the transverse compression caused by embedding the fabric and molding the tire in a manner which is now well known. If desired the joint may be made at an oblique angle to a longitudinal axis or plane of the tube as shown in Fig. 4, providing greater coöperating areas of the fabric at the joint.

Opposite edges of the fabric strips are provided with means, as indicated at 7, adapted to resist strains along these edges tending to cause the fabric to part from the rubber therealong.

If desired the fabric may be slotted preferably in crisscross fashion as indicated at 10 in Figs. 5 and 7 the openings, or slots, thereby more readily permitting the fabric to follow its natural tendency to contract transversely when the same is stretched longitudinally or to contract longitudinally under greater transverse strain. This will permit yield in either a transverse or longitudinal direction and according to the direction of yield the contraction in the other direction compensates for any loss in constriction of the rubber in that direction. It will therefore be noted that the puncture-proof or puncture healing effect of the tire is maintained no matter in which direction the tube stretches. Also if desired a plurality of fabric strips matched end to end and slightly apart as in Fig. 6 may be provided. This construction avoids the extra labor of an overlapping joint, and the strips can be slotted as in Fig. 7 for the purposes hereinbefore set forth.

It will be obvious from the above description that means are provided which accomplish, among others, all of the objects and advantages hereinbefore set forth.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a device of the nature described, in combination, a rubber tube, and a plurality of strips of fabric embedded in the tube with adjacent ends yieldingly connected together, certain of said strips comprising respectively intersecting slots terminating short of the side edges of said strips.

2. In a device of the nature described, in combination, a tube of elastic material, and a flexible stay at the tread portion, said stay having openings adapting said stay to extend and contract both longitudinally and transversely of said tube and said stay being so associated with said tube as to cause transverse compression of said tread portion upon extension of said stay longitudinally of said tube.

3. In a device of the nature described, in combination, a tube of elastic material, and a flexible stay at the tread portion, said stay having openings adapting said stay to extend and contract both longitudinally and transversely of said tube and said stay being so associated with said tube as to cause transverse compression of said tread portion upon extension of said stay longitudinally of said tube and vice versa.

4. In a device of the nature described, in combination, a tube of elastic material, and a flexible stay at the tread portion, said stay being constructed to be extensible and contractible both longitudinally and transversely of said tube and having intersecting slots intermediate its longitudinal edges.

In testimony whereof I affix my signature, in the presence of two witnesses.

A. GROVER FITZ GERALD.

Witnesses:
H. M. SEAMANS,
J. THOMSON.